(12) United States Patent
Ziech

(10) Patent No.: US 7,178,824 B2
(45) Date of Patent: Feb. 20, 2007

(54) WALKING BEAM TRAILER SUSPENSION SLIDER

(75) Inventor: James F. Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 331 days.

(21) Appl. No.: 10/722,099

(22) Filed: Nov. 25, 2003

(65) Prior Publication Data

US 2005/0110242 A1   May 26, 2005

(51) Int. Cl.
*B60G 5/02* (2006.01)

(52) U.S. Cl. ...................................... 280/678

(58) Field of Classification Search ............... 280/677, 280/678, 679, 680, 681, 124.177; 267/279, 267/292, 293, 140.12
See application file for complete search history.

(56) References Cited

U.S. PATENT DOCUMENTS

| | | | |
|---|---|---|---|
| 3,142,493 A * | 7/1964 | Hartzell et al. | 280/680 |
| 3,520,548 A | 7/1970 | McGee | |
| 3,918,736 A | 11/1975 | Hickman | |
| 3,936,073 A * | 2/1976 | Hickman et al. | 280/681 |
| 4,155,570 A | 5/1979 | Wiley, Jr. | |
| 4,714,269 A * | 12/1987 | Raidel | 280/683 |
| 4,775,166 A | 10/1988 | VanDenberg et al. | |
| 4,871,188 A | 10/1989 | Baxter | |
| 4,991,868 A * | 2/1991 | VanDenberg | 280/86.75 |
| 5,366,237 A | 11/1994 | Dilling et al. | |
| 6,193,266 B1 | 2/2001 | Cortez et al. | |
| 6,585,286 B2 * | 7/2003 | Adema et al. | 280/677 |
| 6,916,037 B2 * | 7/2005 | Baxter et al. | 280/683 |
| 7,000,724 B2 * | 2/2006 | Lamela et al. | 180/242 |
| 2003/0127819 A1 | 7/2003 | Richardson | |
| 2003/0209872 A1 | 11/2003 | Baxter et al. | |
| 2003/0214118 A1 | 11/2003 | Pavuk | |
| 2004/0012171 A1 | 1/2004 | McKenzie et al. | |
| 2005/0263985 A1 | 12/2005 | Miller | |

FOREIGN PATENT DOCUMENTS

| | | |
|---|---|---|
| KR | 2004-0003817 | 1/2004 |
| WO | WO 00/66378 | 11/2000 |

OTHER PUBLICATIONS

"INTRAAX", The Boler Company, 3 pages (Mar. 1998).
"VANTRAAX", The Boler Company, 3 pages (copyright 2001).
www.hendrickson-intl.com/products/parts.asp 3 pages.
www.yorktransport.com/dreadnought_bogie.htm 1 page.
www.toledospring.com/tssa2.html 1 page.
www.hendrickson-intl.com/products/product_detail/rt_rte_series.asp 1 page.
"Motor Truck Engineering Handbook" pp. 165, 170.

* cited by examiner

*Primary Examiner*—David R. Dunn
(74) *Attorney, Agent, or Firm*—Dykema Gossett PLLC

(57) ABSTRACT

A suspension is provided that comprises a tandem axle walking beam with a vertically compliant center pivot bushing and a spring medium located over each axle center. The walking beam is rigidly attached to the axles and is pivotally coupled to a frame of the vehicle at a location intermediate of the first and second axles.

18 Claims, 1 Drawing Sheet

WALKING BEAM TRAILER SUSPENSION SLIDER

BACKGROUND OF THE INVENTION

1. Field of the Invention

The present invention relates to a vehicle suspension, and more particularly, to a walking beam suspension used to position and control axle movement for a trailer.

2. Discussion of Related Art

A conventional vehicle includes a vehicle frame having a pair of longitudinally extending frame rails that support the vehicle engine and body. The frame is supported on a plurality of ground-engaging wheels that are disposed at opposite ends of a plurality of axles. The vehicle may contain, for example, a steer axle on which the wheels are steerable by the vehicle operator, a drive axle whose wheels are driven by the vehicle engine, and one or more non-driven trailer axles. Each of the axles are coupled to the vehicle frame through a suspension that dampens movements transmitted between the wheels and the vehicle frame.

One conventional tandem axle suspension is a walking beam suspension. In a walking beam suspension, a walking beam is located on either side of the vehicle extending longitudinally with respect to the vehicle. Each walking beam is coupled to forward and rear axles of a tandem axle proximate the forward and rear ends, respectively, of the walking beam. The walking beams are also pivotally mounted to the vehicle frame at a location intermediate the forward and rear axles. Although the walking beam may be rigidly attached to the axles using, for example, U-bolts, a more common walking beam suspension has a pivotal bushing connection of the walking beam to the axle and requires a secondary suspension linkage in addition to the walking beam to form a parallelogram linkage geometry for controlling axle jounce and rebound motion. Conventional walking beam suspensions also typically include a single spring disposed between each walking beam and vehicle frame.

Conventional walking beam suspensions have several drawbacks. When the walking beam is rigidly attached to the axles, the use of U-bolts and other means of connecting the walking beams to the axles of the vehicle increase the cost and weight of the suspension. In the more typical walking beam suspension in which the walking beam is pivotally connected to the axles, the requirement for a secondary linkage to control axle movement increases the cost and weight of the suspension. The walking beams in conventional suspensions also suffer undesirable stress from absorbing spring loads in the suspension due to bending loads in the walking beam. The walking beam pivot point inputs a concentrated load into the vehicle frame due to the typical single spring location per side for two axles.

The inventors herein have recognized a need for a vehicle suspension that will minimize and/or eliminate the above-identified deficiencies.

SUMMARY OF THE INVENTION

The present invention provides a suspension for a vehicle. The suspension includes a beam having first and second spaced side walls and a lateral wall extending between the first and second side walls. The first and second side walls define first and second recesses proximate first and second ends, respectively, of the beam. The first and second recesses receive first and second axles of the vehicle. The beam is pivotally coupled to a frame of the vehicle at a location intermediate of the first and second axles.

A suspension in accordance with the present invention is advantageous to existing walking beam suspension designs because the open channel configuration of the walking beam and the elimination of the secondary linkage results in lower weight and cost as compared to conventional walking beam suspensions.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
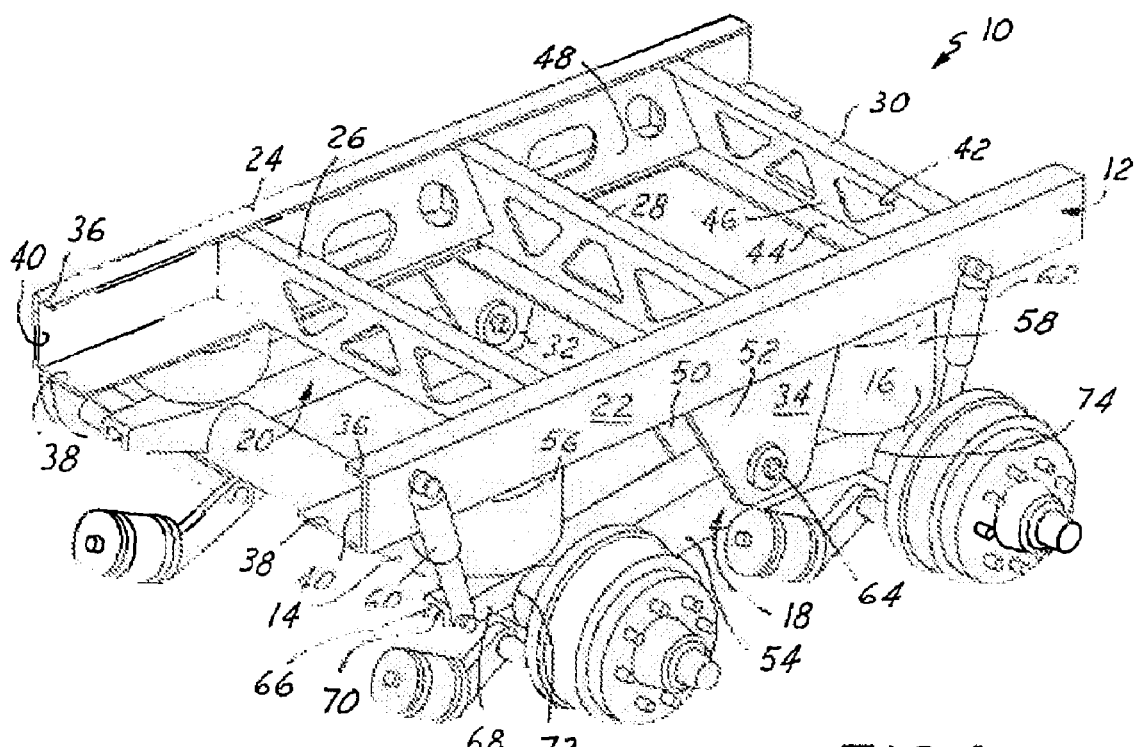
FIG. 1 is perspective view of a portion of a vehicle incorporating a suspension in accordance with one embodiment of the present invention.

Referring now to the drawings wherein like reference numerals are used to identify identical components in the various views, FIG. 1 illustrates a perspective view of a portion of a vehicle 10 including a frame 12 and axles 14, 16. Vehicle 10 further includes a pair of suspensions 18, 20 in accordance with one embodiment of the invention.

Frame 12 is provided to support various components of the vehicle and is conventional in the art. In the illustrated embodiment, frame 12 comprises a trailer frame for use with heavy trucks. It should be understood, however, that the present invention may find use with a variety of vehicle frames and in a variety of vehicles. Frame 12 may include side rail members 22, 24, cross members 26, 28, and 30, and one or more brackets such as brackets 32, 34.

Rail members 22, 24 extend in the longitudinal direction of the vehicle generally parallel to one another. Rail members 22, 24 are generally C-shaped in cross-section and open towards one another in a conventional manner. Each rail member 22, 24 includes top and bottom walls, 36, 38 and a side wall 40, respectively. Walls 36, 38 may extend transverse to the longitudinal direction of the vehicle (and substantially horizontally relative to earth ground) in an inboard direction while wall 40 extends perpendicular (and substantially vertically relative to earth ground) relative to walls 36, 38.

Cross-members 26, 28, and 30 connect rail members 22, 24. Members 26, 28, and 30 extend transversely relative to rail members 22, 24. Members 26, 28, and 30 may also be generally C-shaped or Z-shaped in cross-section, with members 26, 28, and 30 opening towards the front or rear of the vehicle frame 12. Each of cross-members 26, 28, and 30 may include top and bottom walls 42, 44, and side wall 46. Walls 42, 44 extend forward or rearward relative to the direction of vehicle travel (and substantially horizontally relative to earth ground) while wall 46 extends perpendicular to walls 42, 44 (and generally vertically relative to earth ground). Each member 26, 28, and 30 may include first and second ends configured to be received between top and bottom walls 36, 38 and against the wall 40 of rail members 22, 24 respectively. Additional longitudinal members 48 may extend between and couple cross members 26, 28, 30.

Brackets 32, 34 are provided for coupling suspensions 18, 20 to frame 12 as described in greater detail below. Each bracket 32, 34 extends from a corresponding rail 22, 24 in the vertical direction towards relative earth ground. Each bracket 32, 34 may comprise two trapezoidal plates 50, 52 with the longer of the two parallel sides of each plate 50, 52 coupled to one of rails 22, 24. Plates 50, 52 are spaced from one another and define aligned apertures for a purpose described below.

Axles 14, 16 support frame 12 on ground engaging wheels (not shown) disposed at either end of each axles 14, 16. Axles 14, 16 are conventional in the art and comprise non-driven trailer axles in the illustrated embodiment. Axles 14, 16 extend transverse to the longitudinal direction of vehicle 10 and frame 12. In the illustrated embodiment, axles 14, 16 are circular in cross-section. It should be understood, however, that the shape of axles 14, 16 may be varied without departing from the scope of the present invention.

Suspensions 18, 20 are provided to dampen movements between axles 14, 16 and frame 12. In accordance with the present invention, each suspension 18, 20 may include a beam 54. Each suspension 18, 20 may also include springs 56, 58 and shock absorbers 60, 62. Each suspension 18, 20 may also include a bushing 64 (best shown in FIG. 3) in accordance with another aspect of the present invention. Although only suspension 18 is fully illustrated in FIGS. 1–2, it should be understood that suspension 20 may be substantially similar in structure and function.

Beam 54 is provided to equalize the static ground load between axles 14, 16. Beam 54 creates a center pivot point so that axles 14, 16 maintain a parallel relationship when encountering road bumps and the vehicle's wheels remain in contact with the road surface. Each beam 54 extends in the longitudinal direction of frame 12 of vehicle 10 and may be substantially parallel to a corresponding rail 22, 24 of frame 12. Beam 54 is pivotally coupled to frame 12 of vehicle 10 at a location intermediate axles 14, 16. In particular, each beam 54 is coupled to a corresponding bracket 32, 34 of frame 12 and is disposed between plates 50, 52 of bracket 32 or 34. The longitudinal center of beam 54 may be aligned with the longitudinal center of bracket 32, 34.

Beam 54 is generally C-shaped in cross-section, opening towards the ground. Alternately, beam 54 may take the form of an I-beam or be partially or completely closed to form a fully boxed-in cross section (not shown). The use of beam 54 over multiple axles 14, 16 helps to reduce fore-aft movement during vehicle loading and unloading. Beam 54 may include spaced side walls 66, 68 and a lateral wall 70 extending between side walls 66, 68.

Figure 2:
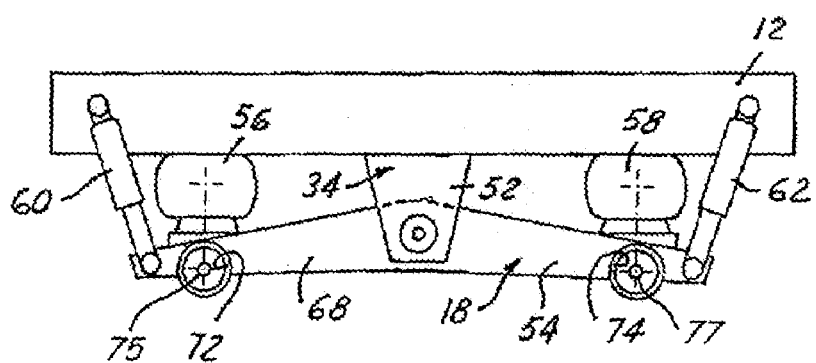
FIG. 2 is a side view of a suspension in accordance with one embodiment of the present invention.

Side walls 66, 68 extend vertically relative to earth ground and are also perpendicular to axles 14, 16. Referring to FIG. 2, side walls 66, 68 are widest at a location of beam 54 intermediate the longitudinal ends of beam 54 and axles 14, 16. In particular, walls 66, 68 may taper moving from the longitudinal center of beam 54 to each end of beam 54. Side walls 66, 68 may define aligned apertures configured for alignment with the apertures in plates 50, 52 of a corresponding bracket 32, 34. Side walls 66, 68 define recesses 72, 74 proximate either longitudinal end of beam 54. Recesses 72, 74 are configured to receive axles 14, 16. In the illustrated embodiment each recess 72, 74 is semicircular in shape and encompasses approximately 180 degrees of a corresponding axle 14, 16. It should be understood, however, that the shape of recesses 72, 74 may be varied without departing from the spirit of the present invention. In one embodiment of the suspension, beam 54 is rigidly attached to axles 14, 16 at recesses 72, 74 using welds or adhesives.

Lateral wall 70 extends perpendicular to side walls 66, 68 and transverse to the longitudinal direction of the vehicle (and substantially horizontally relative to earth ground). Lateral wall 70 may taper from a central longitudinal point of beam 54 towards either longitudinal end of beam 54. Lateral wall 70 supports springs 56, 58.

Springs 56, 58 are provided to control the position of the trailer to axles 14, 16 and serve to prevent stress from being placed on beam 54 under a static condition. Springs 56, 58 cushion bumps on the road surface to keep the vehicle 10 level during operation. Springs 56, 58 may comprise air springs or metal springs, such as coil springs. Springs 56, 58 are positioned between the vehicle frame 12 and the beams 54. Specifically, springs 56, 58 are positioned between bottom wall 38 of a corresponding rail 22, 24 and lateral wall 70 of beam 54 or on a separate spring seat attached to the wall 70 of beam 54. At least a portion of each spring 56, 58 may be disposed above a corresponding axle 14, 16 respectively. In a preferred embodiment, springs 56, 58 may further be centered along the longitudinal axes 75, 77 of axles 14, 16 respectively. Locating springs 56, 58 in this manner is advantageous because the springs absorb stress that would otherwise be placed on beams 54.

Shock absorbers 60, 62 are provided to dampen the shock of bumps encountered on the road surface and to maintain contact between the wheels of vehicle 10 and the road surface. Shock absorbers 60, 62 are conventional in the art. Shock absorbers 60, 62 may be coupled at one end to beam 54 and at another end to frame 10. In particular, one end of each shock absorber 60, 62 is coupled to side wall 68 of beam 54 at the longitudinal ends of beam 54 while another end is coupled to side wall 40 of a corresponding rail 22, 24. Locating shock absorbers 60, 62 at the longitudinal ends of beam 54 is advantageous because shock absorbers 60, 62 are distant from the pivot points of beams 54 and produce a good shock motion ratio and optimum damping. Shock absorbers 60, 62 are coupled to wall 68 of beam 54 at a point forward of axle 14 and rearward of axle 16, respectively. In the illustrated embodiment, the end of shock absorber 60 coupled to frame 12 is forward of the end of shock absorber 60 coupled to beam 54 while the end of shock absorber 62 coupled to frame 12 is rearward of the end of shock absorber 62 coupled to beam 54. Although the illustrated embodiment includes multiple shock absorbers 60, 62 between each beam 54 and frame 12, a single shock absorber could alternatively be used if mounted between (and preferably centered on) axles 14, 16.

Figure 3:
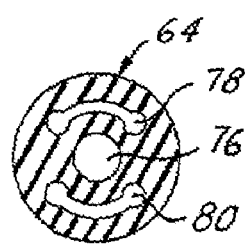
FIG. 3 is a side view of a bushing in accordance with one embodiment of the present invention.

Referring now to FIG. 3, bushings 64 are provided to allow rotational or pivotal movement of beams 54 relative to brackets 32, 34. Bushings 64 may include a conventional elastic material such as rubber disposed between concentric metal sleeves in a conventional manner. Bushings 64 are disposed within the aligned apertures in walls 66, 68 of beams 54, between plates 50, 52 of brackets 32, 34. Referring to FIG. 2, bushings 64 may be located at the longitudinal center of beams 54 and brackets 32, 34. Referring again to FIG. 3, in accordance with one aspect of the present invention, bushing 64 defines a central aperture 76 and voids 78, 80. Referring to FIG. 1, aperture 76 is configured to receive a metal sleeve (not shown) and a fastener 84 that extends through the metal sleeve and the aligned apertures in walls 66, 68 of beam 54 and plates 50, 52 of a corresponding bracket 32, 34.

Referring again to FIG. 3, voids 78, 80 allow greater vertical compliance of bushings 64. Voids 78, 80 may be diametrically opposed. Voids 78, 80 may have an arcuate shape in one embodiment of the invention. Further, voids 78, 80 may have a curved dumbbell shape in which both arcuate ends of voids 78, 80 are rounded and slightly larger in a radial dimension than the middle curved portion of the voids 78, 80. Voids 78, 80 are located above and below the central aperture 76 on an axis extending radially from the central aperture 76, perpendicular to a road surface. Voids 76, 78 allows greater vertical compliance of bushing 64 for ride and roll stiffness. The absence of voids 76, 78 on the fore and aft sides of aperture 74 provides greater stiffness in the fore-aft direction for brake load transfer and cornering stability.

A suspension in accordance with the present invention is advantageous compared to conventional walking beam suspensions. The inventive suspension eliminates the need for U-bolts or other connectors, which increase the weight and complexity of the suspension, to couple the walking beams to the axles. Further, the open-channel configuration of the beams 54 and the elimination of a secondary linkage in the inventive suspension decrease the weight and cost of the suspension system relative to conventional suspensions.

While the invention has been particularly shown and described with reference to the preferred embodiments thereof, it is well known by those skilled in the art that various changes and modifications can be made in the invention without departing from the spirit and scope of the invention.

I claim:

1. A vehicle suspension, comprising:
   a beam extending between and coupled to first and second axles, each of said first and second axles supporting wheels at each end of said axle, said beam having an aperture extending therethrough;
   a bushing having a central aperture and first and second diametrically opposed voids, said bushing disposed within said aperture in said beam and pivotally coupling said beam to a vehicle frame at a location intermediate said first and second axles; and,
   first and second springs positioned between said vehicle frame and said beam, said first and second springs disposed above said first and second axles, respectively.

2. A The vehicle suspension of claim 1, wherein said beam has first and second spaced side walls and a lateral wall extending between said first and second side walls, said first and second side walls defining first and second recesses proximate first and second ends, respectively, of said beam,
   said first and second recesses receiving said first and second axles.

3. The suspension of claim 2 wherein said first and second spaced side walls are widest at said location and taper moving from said location to said first end of said beam and from said location to said second end of said beam.

4. The suspension of claim 2 wherein said first and second side walls and said lateral wall define a C-shaped cross-section and open towards said first and second axles.

5. The suspension of claim 1 wherein said beam is rigidly attached to said first and second axles.

6. The suspension of claim 1 wherein said first spring is centered above a longitudinal axis of said first axle and said second spring is centered above a longitudinal axis of said second axle.

7. The suspension of claim 1 further comprising first and second shock absorbers coupled at first ends to said first and second ends of said beam, respectively, and at second ends to said frame.

8. The suspension of claim 7 wherein said second end of said first shock absorber is forward of said first end of said first shock absorber and said second end of said second shock absorber is rearward of said first end of said second shock absorber.

9. The suspension of claim 1, further comprising:
   a fastener extending through said central aperture of said bushing and coupling said beam to said vehicle frame at said location.

10. The suspension of claim 1 wherein said first and second diametrically opposed voids are located above and below said central aperture on an axis extending radially from said central aperture, perpendicular to a road surface.

11. The suspension of claim 10 wherein said first and second diametrically opposed voids are of an arcuate shape.

12. A vehicle suspension, comprising:
    a beam having first and second spaced side walls and a lateral wall extending between said first and second side walls, said first and second side walls defining first and second recesses proximate first and second ends, respectively, of said beam, said first and second side walls and said lateral wall defining a C-shaped cross-section and open towards said first and second axles;
    first and second springs positioned between a frame of said vehicle and said beam
    wherein said first and second recesses receive first and second axles of a vehicle and said beam is rigidly attached to said first and second axles and pivotally coupled to said frame of said vehicle at a location intermediate of said first and second axles.

13. The suspension of claim 12 wherein at least portions of said first and second springs are disposed above said first and second axles respectively.

14. The suspension of claim 13 wherein said first spring is centered above a longitudinal axis of said first axle and said second spring is centered above a longitudinal axis of said second axle.

15. The suspension of claim 12 further comprising first and second shock absorbers coupled at first ends to said first and second ends of said beam, respectively, and at second ends to said frame.

16. The suspension of claim 15 wherein said second end of said first shock absorber is forward of said first end of said first shock absorber and said second end of said second shock absorber is rearward of said first end of said second shock absorber.

17. The suspension of claim 12 wherein said first and second spaced side walls are widest at said location and taper moving from said location to said first end of said beam and from said location to said second end of said beam.

18. The suspension of claim 12, further comprising:
    a bushing having a central aperture and first and second diametrically opposed voids, said bushing disposed within an aperture in said beam and said beam coupled to said frame of said vehicle at said location by a fastener extending through said central aperture of said bushing.

* * * * *